(12) United States Patent
Mizuochi et al.

(10) Patent No.: US 8,396,374 B2
(45) Date of Patent: Mar. 12, 2013

(54) DIGITAL SIGNAL PROCESSING OPTICAL TRANSMISSION APPARATUS

(75) Inventors: Takashi Mizuochi, Tokyo (JP); Yoshiaki Konishi, Tokyo (JP); Tatsuya Kobayashi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 203 days.

(21) Appl. No.: 12/920,851

(22) PCT Filed: Mar. 31, 2008

(86) PCT No.: PCT/JP2008/056364
§ 371 (c)(1),
(2), (4) Date: Sep. 3, 2010

(87) PCT Pub. No.: WO2009/122509
PCT Pub. Date: Oct. 8, 2009

(65) Prior Publication Data
US 2011/0002693 A1    Jan. 6, 2011

(51) Int. Cl.
*H04J 14/02* (2006.01)
*H04B 10/04* (2006.01)
(52) U.S. Cl. .......................... 398/197; 398/94
(58) Field of Classification Search .............. 398/94, 398/197
See application file for complete search history.

(56) References Cited

U.S. PATENT DOCUMENTS 5,796,505 A * 8/1998 Ushirozawa ............ 398/157
7,756,421 B2   7/2010 Roberts et al.
2006/0093362 A1* 5/2006 Welch et al. ............ 398/87
2010/0247099 A1* 9/2010 Lowery et al. .......... 398/79
2012/0201546 A1   8/2012 Mizuochi et al.

FOREIGN PATENT DOCUMENTS

| JP | 5-232413 | 9/1993 |
| JP | 8-250792 | 9/1996 |
| JP | 2006 522508 | 9/2006 |
| JP | 2007 259281 | 10/2007 |
| JP | 2007 267001 | 10/2007 |

OTHER PUBLICATIONS

International Search Report issued Jul. 1, 2008 in PCT/JP2008/056364.
Doug Mcghan, et al., "5120 km RZ-DPSK transmission over G652 fiber at 10 Gb/s with no optical dispersion compensation", OFC/NFOE2005, PDP27, Mar. 2005, 3 pages.

(Continued)

*Primary Examiner* — Kenneth N Vanderpuye
*Assistant Examiner* — Daniel Dobson
(74) *Attorney, Agent, or Firm* — Oblon, Spivak, McClelland, Maier & Neustadt, L.L.P.

(57) ABSTRACT

In a digital signal processing optical transmission apparatus such as a predistortion or OFDM type one, optical transmission at a stable S/N ratio is intended to be able to be made by controlling an output of an optical transmission signal with fixed average power, even if a peak to average power ratio of the optical transmission signal changes. The apparatus is provided with an average power calculation unit (30) that calculates the average power of a digital signal outputted from a digital signal processing circuit (2), and an optical power variable unit (31) that serves to make constant the average power of an optical transmission signal outputted from an optical vector modulator (5).

4 Claims, 6 Drawing Sheets

OTHER PUBLICATIONS

Robert Killey, "Dispersion and Nonlinearity Compensation Using Electronic Predistortion Techniques", Optical Fiber Communications and Electronic Signal Processing, Dec. 15, 2005, pp. 2/1-2/6 (with an additional page).

Arthur James Lowery, et al., "Performance of Optical OFDM in Ultralong-Haul WDM Lightwave Systems", IEEE Journal of Lightwave Techonology, vol. 25, No. 1, Jan. 2007, pp. 131-138.

S.J. Savory, "Optimum electronic dispersion compensation strategies for nonlinear transmission", Electronics Letters, vol. 42, No. 7, Mar. 30, 2006, pp. 407-408.

Christoph Wree, et al., "Repeaterless 10.7-Gb/s DPSK Transmission Over 304 km of SSMF Using a Coherent Receiver and Electronic Dispersion Compensation", IEEE Photonics Technology Letters, vol. 20, No. 6, Mar. 15, 2008, pp. 407-409.

John D. Downie, et al., "On the Use of MLSE with Non-Optimal Demodulation Filtering for Optical Duobinary Transmission", OFC/NFOEC2008, OThO5.pdf, Feb. 2008, pp. 1-3.

U.S. Appl. No. 12/826,129, filed Jun. 29, 2010, Sugihara, et al.

* cited by examiner

DIGITAL SIGNAL PROCESSING OPTICAL TRANSMISSION APPARATUS

TECHNICAL FIELD

The present invention relates to an optical transmission apparatus that is applied to an error correction optical communications system, etc., and in particular to a digital signal processing optical transmission apparatus that generates an optical transmission signal by a digital signal processing circuit in particular.

BACKGROUND ART

In general, the wavelength dispersion of an optical fiber is mentioned as a factor to limit an improvement in the bit rate (data transmission rate) of an optical transmission system. The wavelength dispersion is that the propagation speed of an optical signal in an optical fiber differs according to its wavelength, as a result of which there arises a difference in the time at which different wavelength components contained in the optical signal arrive at a receiving end, whereby the waveform of the optical signal being transmitted is caused to distort.

The amount of waveform distortion in this case is proportional to the square of the bit rate, and for example, the amount of waveform distortion at the time of transmitting an optical signal through an optical fiber at a bit rate of 100 Gb/s becomes 100 times with respect to the amount of waveform distortion generated when an optical signal is transmitted through the same optical fiber at a rate of 10 Gb/s. Accordingly, the distance for which an optical signal can be transmitted at a rate of 100 Gb/s by means of an optical fiber of the same optical dispersion property will become $\frac{1}{100}$ in the case of an optical signal being transmitted at a rate of 10 Gb/s.

In order to solve the above-mentioned problem resulting from the wavelength dispersion, there has been conventionally used a device to compensate for the dispersion of an optical fiber. In this case, a so-called dispersion compensation fiber having a dispersion property opposite to that of the optical fiber has been widely put in practical use, but the amount of dispersion of the dispersion compensation fiber is fixed, and besides, there arises a new problem that a light amplifier for compensating for optical loss is needed.

Accordingly, as a relatively new conventional method, there has been proposed a dispersion compensation method using digital signal processing (for example, see a first nonpatent document and a second nonpatent document).

A method described in the first nonpatent document is one in which in digital signal processing at a transmitting side, the waveform distortion of a signal is canceled or removed after transmission thereof by calculating a transmitting data series with a transfer function of a property inverse to that of an optical fiber in advance, and it is called a predistortion (or pre-equalization).

In addition, a method described in the second nonpatent document is one in which a transmitting data series is mapped as a symbol of a multiple value by applying orthogonal frequency division multiplexing (OFDM) to optical communications, and is thereafter converted into a plurality of subcarrier modulation signals by carrying out a discrete inverse Fourier transform. In this case, the speed is divided by the number of subcarriers, so a symbol rate is decreased. For example, if the speed is divided by ten subcarriers, the waveform distortion due to dispersion is decreased to $\frac{1}{100}$.

Here, reference will be made to the predistortion described in the first nonpatent document, while referring to the attached drawings.

FIG. 5 is a block diagram showing the construction of a conventional digital signal processing optical transmission apparatus using predistortion.

In FIG. 5, the digital signal processing optical transmission apparatus is provided with a digital signal processing (DSP) circuit 2 that calculates predistortion based on an information source 1, D/A converters 3a, 3b that each convert into an analog signal a digital signal which has been calculated in the digital signal processing circuit 2, a laser device (hereinafter referred to as a "laser diode") 4 that generates laser light, and an optical vector modulator 5 that modulates a real part and an imaginary part independently of each other and outputs an optical transmission signal 6.

Next, reference will be made to the operation of the conventional apparatus as shown in FIG. 5.

The information source 1 is inputted to the digital signal processing circuit 2 while being subjected to parallel expansion, so that it can be easily arithmetically processed into digital signals.

The digital signal processing circuit 2 is composed of a transversal filter which comprises a delay element, a multiplier and an adder, and a look-up table, wherein it performs arithmetic processing with respect to the information source 1, and outputs digital signals.

At this time, in the digital signal processing circuit 2, a convolution arithmetic operation with the inverse function of the dispersion of an optical fiber is carried out for each of a real part and an imaginary part of the information source 1, so that for example, a 6-bit digital signal is calculated, as shown by a plurality of arrows.

The digital signals from the digital signal processing circuit 2 are converted into corresponding analog signals in the D/A converters 3a, 3b, respectively.

Here, the D/A converter 3a converts a digital signal of the real part into a corresponding analog signal, and the D/A converter 3b converts a digital signal of the imaginary part into a corresponding analog signal.

Subsequently, the optical vector modulator 5 modulates the laser light (direct current light) from the laser diode 4 with the individual analog signals from the D/A converters 3a, 3b, and sends out a modulated optical signal to the optical fiber as the optical transmission signal 6.

At this time, the transmission waveform of the optical transmission signal 6 is beforehand made distorted in such a manner that the optical transmission signal 6 can be restored to its original state by the waveform distortion thereof received due to the dispersion of the optical fiber, and hence it is called predistortion.

FIG. 6 is an explanatory view showing the waveform of the optical transmission signal 6 controlled by the conventional digital signal processing optical transmission apparatus (FIG. 5).

FIG. 6(a) is a waveform in cases where the amount of dispersion to be compensated for is large, with peaks of large amplitudes being generated at a certain frequency.

In predistortion, D/A conversion is carried out with a peak of the calculation result being set as an upper limit, so the average value of optical power to be transmitted is caused to change with a ratio of peak power to average power (a peak to average power ratio: PAPR).

In FIG. 6(a), the largest amplitude is assigned to the most significant bit of a digital signal, and an amplitude less than that is assigned to a lower bit thereof, as a result of which average power decreases (the power ratio PAPR is approximately 6).

On the other hand, FIG. 6(b) shows a waveform in cases where the amount of dispersion to be compensated for is zero, and is a waveform itself of an original information source represented by a binary NRZ signal. In this case, average power is a half of peak power.

[First Nonpatent Document]

D. McGhan, et al., "5120 km RZ-DPSK transmission over G652 fiber at 10 Gb/s with no optical dispersion compensation", OFC/NFOEC2005, PDP27, Anaheim, Calif., March 2005.

[Second Nonpatent Document]

A. J. Lowery, et al., "Performance of optical OFDM in ultra long-haul WDM lightwave systems", IEEE Journal of Lightwave Technology, vol. 25, no. 1, pp. 131-138, January 2007.

DISCLOSURE OF THE INVENTION

Problems to be Solved by the Invention

In the conventional digital signal processing optical transmission apparatus, when the average power changes according to the amount of dispersion to be compensated for, such as in cases where the average power becomes small, as shown in FIG. 6(a), or in cases where the average power becomes one half of the peak, as shown in FIG. 6(b), the average optical power of the optical transmission signal 6 becomes extremely small in cases where the amount of dispersion compensation (i.e., the power ratio PAPR) is large. As a result, the required signal to noise ratio (S/N ratio) is not obtained, and even if dispersion compensation is carried out at a receiving end, the S/N ratio of the optical transmission signal 6 will not reach a required value, thus giving rise to a problem that a bit error occurs.

The present invention has been made so as to solve the problem as referred to above, and has for its object to obtain a digital signal processing optical transmission apparatus which is capable of avoiding a decrease (or change) in the average power of an optical transmission signal depending on a change in the amount of dispersion compensation.

Means for Solving the Problems

A digital signal processing optical transmission apparatus according to the present invention is provided with a digital signal processing circuit that outputs a digital signal based on an information source, a D/A converter that converts the digital signal into an analog signal, a laser device that generates laser light, an optical modulator that modulates the laser light based on the analog signal, an average power calculation unit that calculates an average power control signal, and an optical power variable unit that controls modulated light outputted from the optical modulator in response to the average power control signal so as to provide an optical transmission signal which is proportional to average power, wherein the average power calculation unit controls the optical power variable unit in such a manner that the average power of the optical transmission signal becomes constant.

Effect of the Invention

According to the present invention, it is possible to avoid a decrease or change in the average value of optical transmission signal power due to a change in the amount of dispersion compensation.

BEST MODE FOR CARRYING OUT THE INVENTION (First Embodiment)

Hereinafter, a first embodiment of the present invention will be explained in detail while referring to the accompanying drawings. Here, note that the present invention is not limited by the following embodiments.

Figure 1:
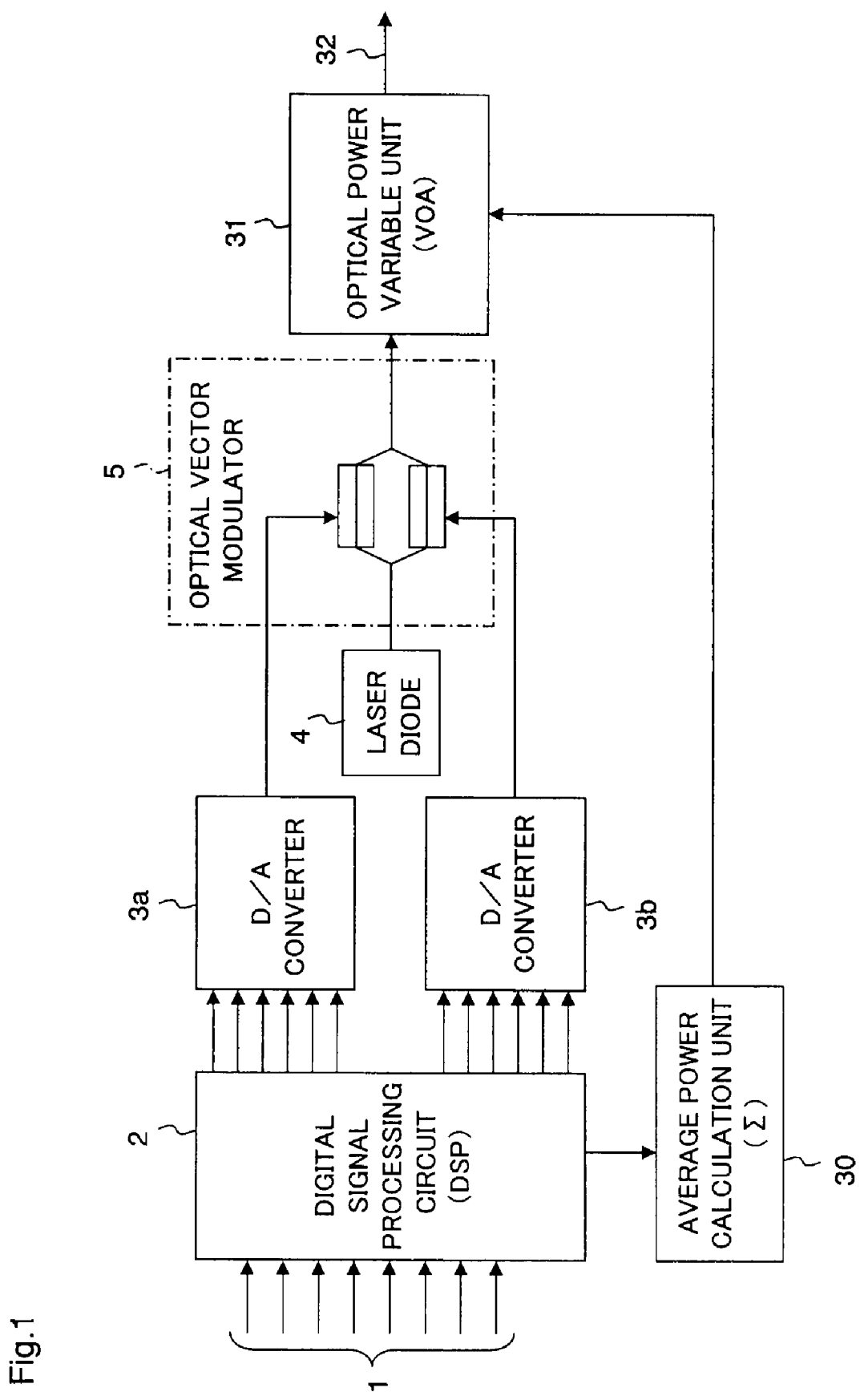
FIG. 1 is a block diagram showing a digital signal processing optical transmission apparatus according to a first embodiment of the present invention. (First Embodiment)
Figure 5:
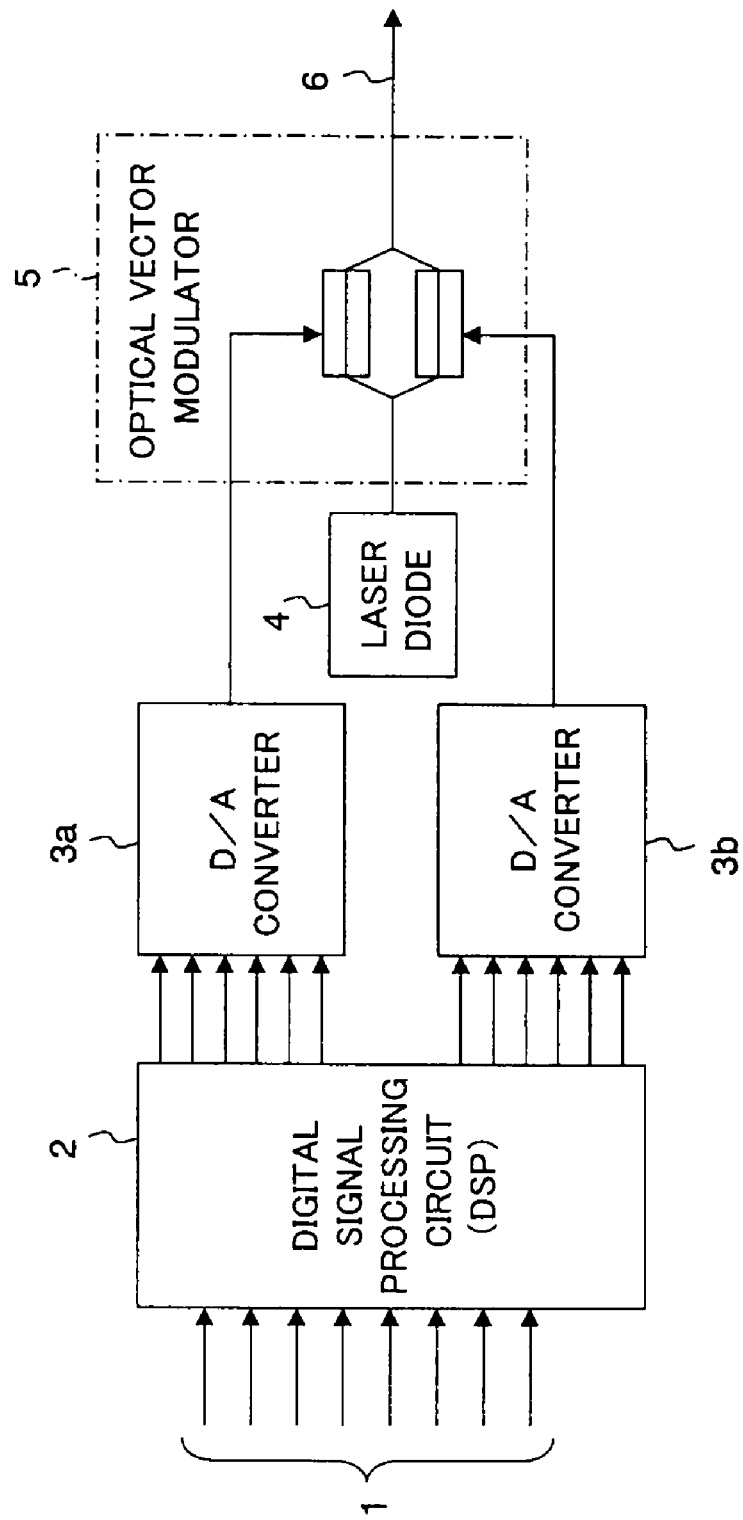
FIG. 5 is a block diagram showing a conventional digital signal processing optical transmission apparatus.

FIG. 1 is a block diagram showing a construction example of a digital signal processing optical transmission apparatus according to a first embodiment of the present invention, wherein those which are similar to the aforementioned ones (see FIG. 5) are denoted by the same reference numerals and characters as those in the aforementioned ones, while omitting a detailed explanation thereof.

In FIG. 1, the digital signal processing optical transmission apparatus is provided with a digital signal processing circuit 2, D/A converters 3a, 3b, a laser diode 4 and an optical vector modulator 5, similar to the above, and is also provided in addition thereto with an average power calculation unit 30 that calculates an average power control signal, and an optical power variable unit 31 that is inserted at an output side of the optical vector modulator 5, and is operated in response to the average power control signal.

Here, note that the optical vector modulator 5 is used similarly as stated above, but the same operational effect will be obtained even if a polar coordinate modulator, for example, is used as another optical modulator. This is the same in other embodiments to be described later.

The light power variable unit 31 controls the modulated light outputted from the optical vector modulator in response to the average power control signal in such a manner that an optical transmission signal 32 is obtained which is proportional to average power.

The average power calculation unit 30 accumulates or integrates the digital signals to be sent to the D/A converters 3a, 3b from the digital signal processing circuit 2 for a fixed period of time, calculates an average power control signal corresponding to the average power of the digital signals, and controls the optical power variable unit 31 in such a manner that the average power of the optical transmission signal 32 becomes constant.

Next, reference will be made to an operation according to this first embodiment of the present invention as shown in FIG. 1.

The average power calculation unit 30 accumulates or integrates, based on the calculation result of the digital signal processing circuit 2, the digital signals sent to the D/A converters 3a, 3b for the fixed period of time, calculates an average value (average power) of the digital signals, and outputs an average power control signal corresponding to the average power thus calculated.

The optical power variable unit 31 is composed of an attenuator (variable optical attenuator: VOA) that serves to make an insertion loss variable in accordance with an applied voltage of the average power control signal. The optical power variable unit 31 carries out output control in such a manner that the optical transmission signal 32 can be made proportional to the average power control signal (average value) outputted from the average power calculation unit 30.

Figure 2:
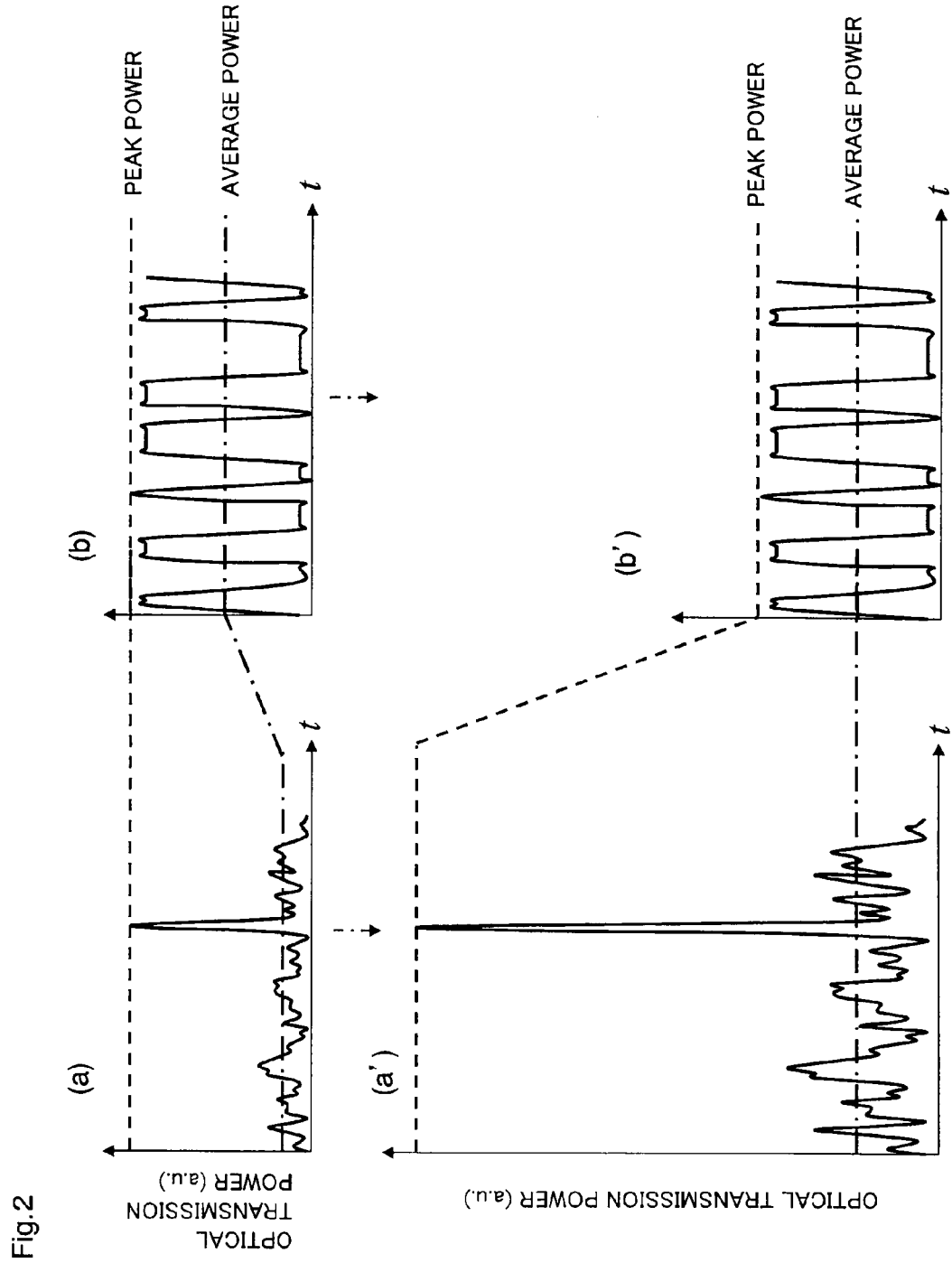
FIG. 2 is an explanatory view showing the waveform of an optical transmission signal controlled in the first embodiment of the present invention in comparison with a conventional waveform. (First Embodiment)

FIG. 2 is an explanatory view showing a waveform control operation of the optical transmission signal according to the first embodiment of the present invention, wherein (a') and (b') show the waveforms of the optical transmission signal 32 generated by the use of the average power calculation unit 30 and the optical power variable unit 31, respectively.

Figure 6:
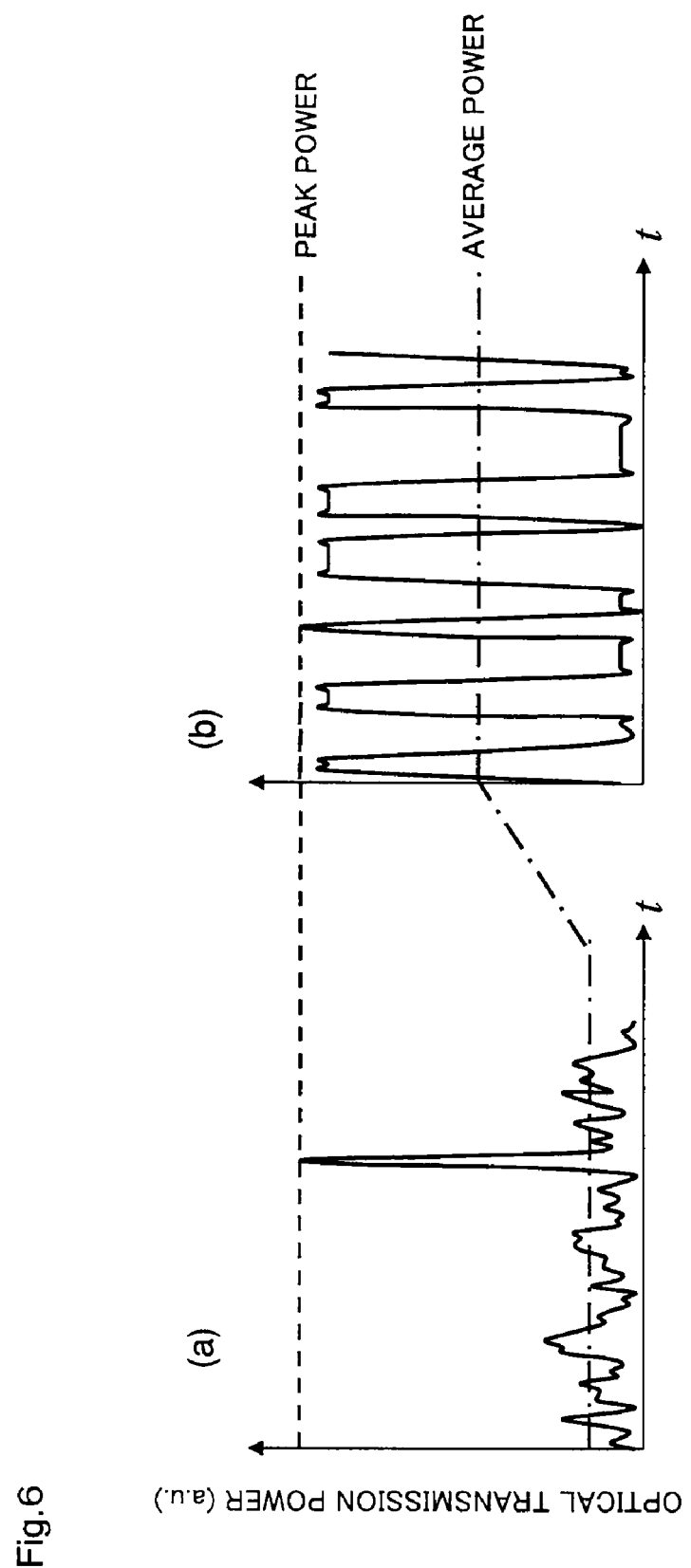
FIG. 6 is an explanatory view showing the waveform of an optical transmission signal controlled by the conventional digital signal processing optical transmission apparatus.

FIGS. 2(a) and 2(b) show waveforms which are the same as the conventional waveforms (FIGS. 6(a) and 6(b)), and are shown for the sake of comparison with the control according to the first embodiment of the present invention. In addition, the waveform of FIG. 2 (b') according to the present invention is the same as the conventional waveform of FIG. 2(b).

In FIG. 2, (a') shows a waveform of which an average value (indicated by an alternate long and short dash line) is controlled to be constant by means of the average power calculation unit 30 and the optical power variable unit 31, wherein the amplitude of the optical transmission signal 32 is controlled in such a manner that the average value of (a') becomes equal to an average value in the waveform of (b') (=b) in cases where the amount of dispersion compensation is zero.

In addition, the average value of the waveform of (b') is the same as that of (a'). That is, the average power (average value: alternate long and short dash line) of the optical transmission signal becomes constant without regard to the difference in peak power (broken line) generated due to a difference in the amount of dispersion compensation, so the optical transmission signal 32 can be transmitted at the same S/N ratio at all times, and a stable transmission characteristic can be obtained.

If the above-mentioned control is not carried out, the optical transmission signal will be transmitted with unnecessarily low average power as in the conventional waveform of FIG. 2(a), and the S/N ratio is deteriorated to a remarkable extent, thus making it impossible to achieve stable transmission.

As described above, the digital signal processing optical transmission apparatus according to the first embodiment of this invention is provided with the digital signal processing circuit 2 that outputs digital signals based on the information source 1, the D/A converters 3a, 3b that converts the digital signals into corresponding analog signals, respectively, the laser diode 4 (laser device) that generates laser light, the optical vector modulator 5 (optical modulator) that modulates the laser light based on the analog signals, the average power calculation unit 30 that calculates an average power control signal, and the optical power variable unit 31 that controls modulated light outputted from the optical vector modulator 5 in response to the average power control signal so as to provide the optical transmission signal 32 which is proportional to average power.

The average power calculation unit 30 accumulates or integrates (Σ) the digital signals to be sent to the D/A converters 3a, 3b from the digital signal processing circuit 2 for the fixed period of time, calculates an average power control signal corresponding to the average power of the digital signals, and controls the optical power variable unit 31 in such a manner that the average power of the optical transmission signal 32 becomes constant. In addition, the optical power variable unit 31 is composed of a variable attenuator.

As a result, it is possible to transmit the optical transmission signal 32 at the same S/N ratio at all times, while avoiding a decrease and change in the average power of the optical transmission signal 32 which depend on a change in the amount of dispersion compensation, and hence it is possible to obtain a digital signal processing optical transmission apparatus which can achieve a stable transmission characteristic.

(Second Embodiment)

Figure 3:
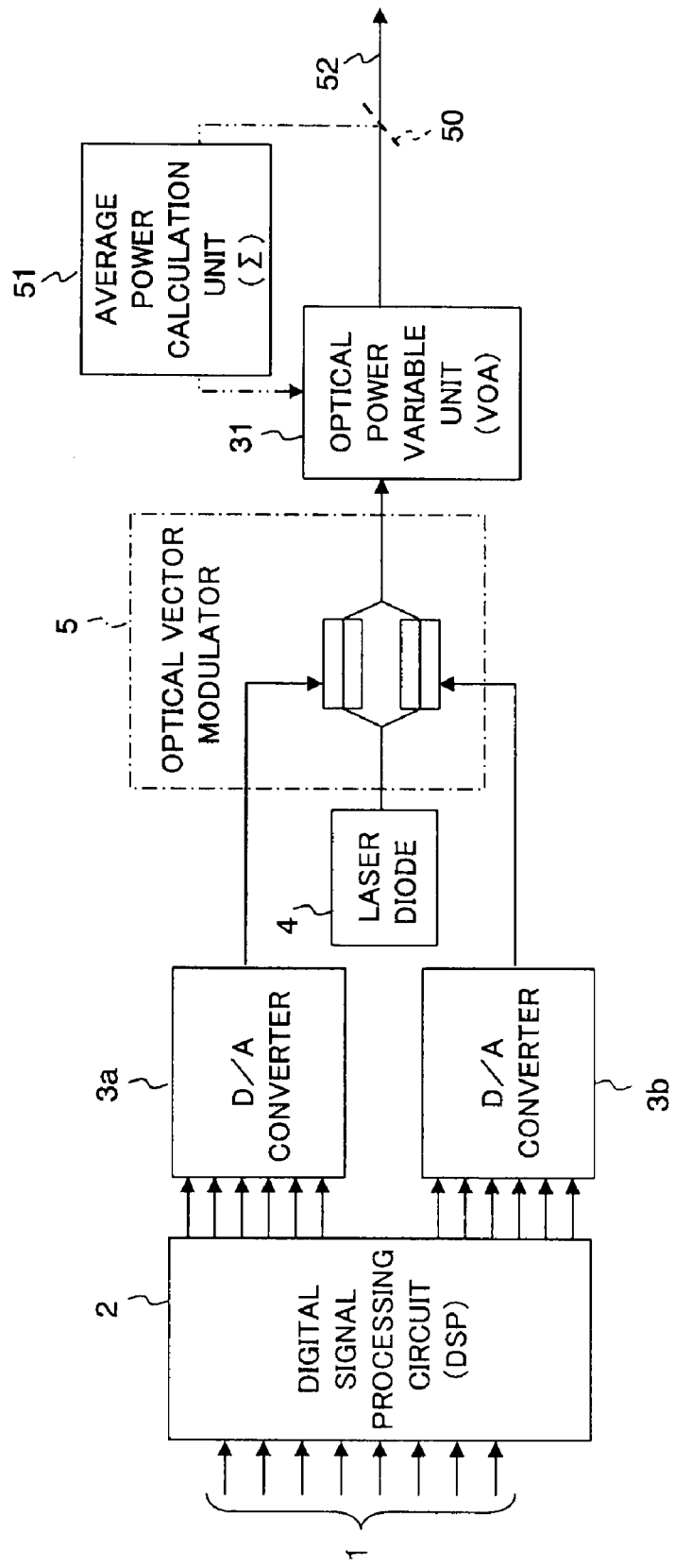
FIG. 3 is a block diagram showing a digital signal processing optical transmission apparatus according to a second embodiment of the present invention. (Second Embodiment)

Although the average power calculation unit 30, being operated based on the digital signals from the digital signal processing circuit 2, has been used in the above-mentioned first embodiment (FIG. 1), an average power calculation unit 51 may instead be used which serves to calculate an average power control signal by monitoring an optical transmission signal from an optical power variable unit 31, as shown in FIG. 3.

FIG. 3 is a block diagram showing a construction example of a digital signal processing optical transmission apparatus according to a second embodiment of the present invention, wherein those which are similar to the aforementioned ones (see FIG. 1) are denoted by the same reference numerals and characters as those in the aforementioned ones, while omitting a detailed explanation thereof.

In FIG. 3, an optical branching unit 50, such as a beam splitter, is arranged at an output terminal side of the optical power variable unit 31.

The optical branching unit 50 branches or divides an optical transmission signal 52 from the optical power variable unit 31 into a branched optical signal, and inputs the branched optical signal to the average power calculation unit 51.

In this case, the average power calculation unit 51 is composed of a photo diode and an integration circuit, for example.

The average power calculation unit 51 monitors the optical transmission signal 52 outputted from the optical power variable unit 31 through the optical branching unit 50, and calculates the average power control signal based on the branched optical signal.

According to this, the average power calculation unit 51 controls the optical power variable unit 31 in such a manner that the average power of an optical transmission signal 52 becomes constant.

As shown in FIG. 3, the optical branching unit 50 and the average power calculation unit 51 having the photo diode and the integration circuit are arranged at the output side of the optical power variable unit 31, so that the optical power variable unit 31 is controlled by the average power control signal which is obtained based on the integration of the branched optical signal branched from the optical transmission signal 52. With this arrangement, too, it is also possible to control the average power of the optical transmission signal 52 so as to be constant, as in the above-mentioned first embodiment.

(Third Embodiment)

Figure 4:
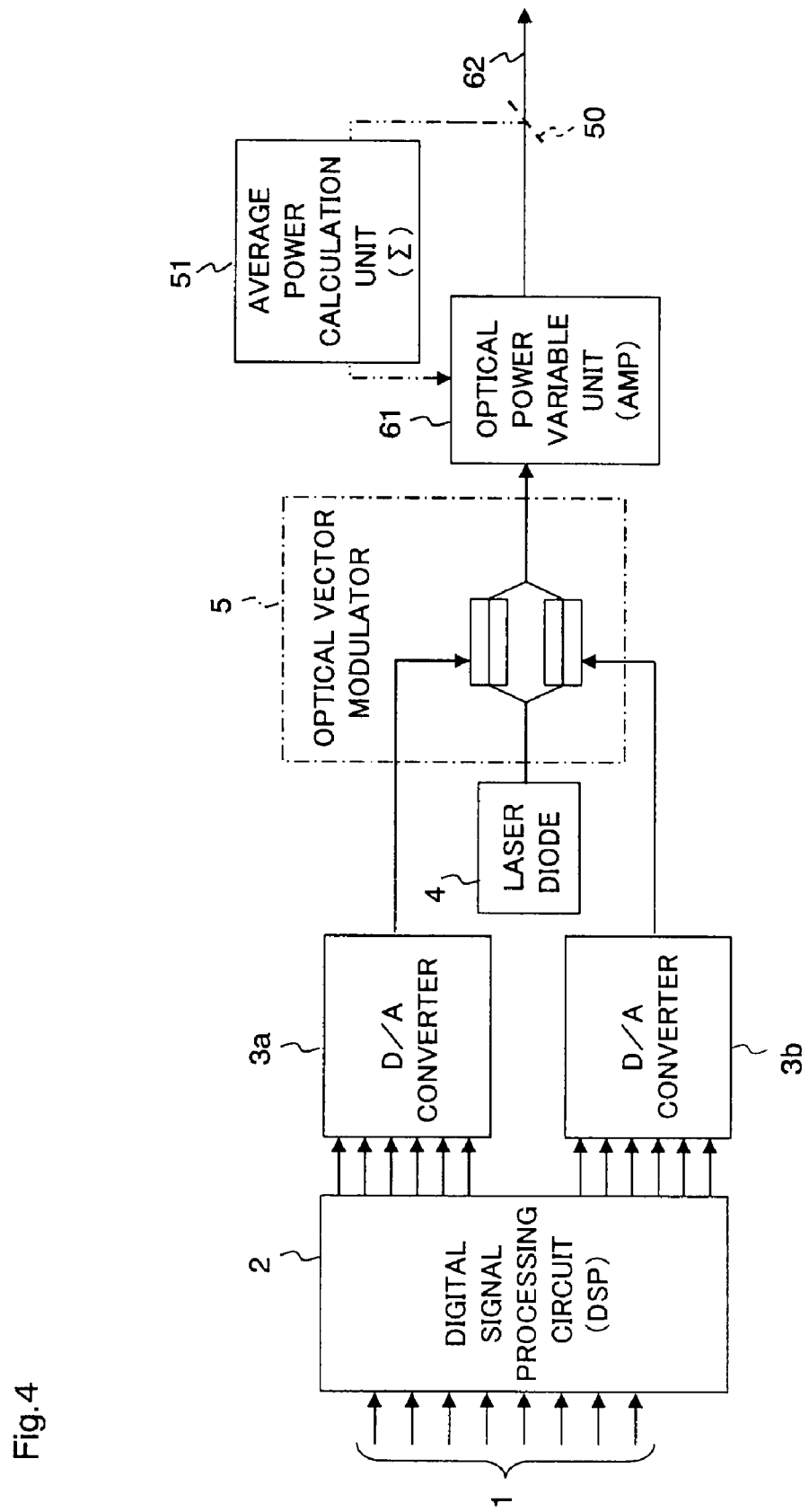
FIG. 4 is a block diagram showing a digital signal processing optical transmission apparatus according to a third embodiment of the present invention. (Third Embodiment)

Although in the above-mentioned first and second embodiments (FIG. 1 and FIG. 3), the optical power variable unit 31, which is composed of the variable attenuator, has been used, an optical power variable unit 61 may instead be used which is composed of an optical amplifier (AMP) having an output variable function, as shown in FIG. 4.

FIG. 4 is a block diagram showing a construction example of a digital signal processing optical transmission apparatus according to a third embodiment of the present invention, wherein those which are similar to the aforementioned ones (see FIG. 2) are denoted by the same reference numerals and characters as those in the aforementioned ones, while omitting a detailed explanation thereof.

Here, note that the optical power variable unit 61 composed of an optical amplifier is representatively applied in the construction of the second embodiment (FIG. 3), but needless to say, it can also be applied in the construction of the first embodiment (FIG. 1).

In FIG. 4, the optical power variable unit 61 is composed of the optical amplifier having an output variable function.

In this case, similarly as stated above, an optical transmission signal 62 outputted from the optical power variable unit 61 is branched by means of an optical branching unit 50 into a branched optical signal which is inputted to an average power calculation unit 51.

The average power calculation unit 51 calculates an average power control signal based on the branched optical signal, and controls the excitation power of the optical power variable unit (optical amplifier) 61 in such a manner that the average power of the optical transmission signal 62 becomes constant.

As shown in FIG. 4, even by the use of the optical power variable unit 61 composed of an optical amplifier, the average power of the optical transmission signal 62 can be controlled so as to be constant, as in the above-mentioned first and second embodiments, thus making it possible to achieve an operational effect equivalent to the above-mentioned one.

Although in the above-mentioned first through third embodiments, the explanation has been made by taking the case of a digital signal processing optical transmission apparatus according to a predistortion method, it is possible to obtain an operational effect of making the average power of an optical transmission signal constant, even by applying the same technique to a digital signal processing optical transmission apparatus using an OFDM scheme. In this case, for example, a discrete inverse Fourier transform circuit of an OFDM transmitter can be used in place of the digital signal processing circuit 2 in FIG. 1.

Further, it goes without saying that the present invention can be applied to any digital signal processing optical apparatus other than those of the predistortion or OFDM type as long as the power ratio PAPR is changed due to modulation.

INDUSTRIAL APPLICABILITY

As described above, a digital signal processing optical transmission apparatus according to the present invention can be applied to a transmission apparatus which performs dispersion compensation of an optical transmission system.

The invention claimed is:

1. A digital signal processing optical transmission apparatus comprising:
    a digital signal processing circuit that outputs a digital signal based on an information source;
    a D/A converter that converts said digital signal into an analog signal;
    a laser device that generates laser light;
    an optical modulator that modulates said laser light based on said analog signal;
    an average power calculation unit that calculates an average power control signal based on a signal which controls a power of said laser light, the signal being from the digital signal processing circuit; and
    an optical power variable unit that controls modulated light outputted from said optical modulator in response to said average power control signal so as to provide an optical transmission signal which is proportional to said average power;
    wherein said average power calculation unit controls said optical power variable unit in such a manner that average power of said optical transmission signal becomes constant.

2. The digital signal processing optical transmission apparatus as set forth in claim 1, wherein
    said average power calculation unit accumulates the digital signal sent to said D/A converter from said digital signal processing circuit for a fixed period of time, and calculates an average power control signal corresponding to the average power of said digital signal.

3. The digital signal processing optical transmission apparatus as set forth in claim 1, wherein
    said optical power variable unit comprises a variable attenuator.

4. The digital signal processing optical transmission apparatus as set forth in claim 1, wherein
    said optical power variable unit comprises an optical amplifier having an output variable function.

* * * * *